United States Patent [19]
Schuck, III et al.

[11] Patent Number: 5,868,951
[45] Date of Patent: Feb. 9, 1999

[54] ELECTRO-OPTICAL DEVICE AND METHOD

[75] Inventors: Miller H. Schuck, III, Nederland; Douglas J. McKnight; Kristina M. Johnson, both of Boulder, all of Colo.

[73] Assignee: University Technology Corporation, Boulder, Colo.

[21] Appl. No.: 853,462

[22] Filed: May 9, 1997

[51] Int. Cl.[6] .................................................. B44C 1/22
[52] U.S. Cl. .............................. 216/24; 216/23; 216/38; 216/41; 349/42; 349/122
[58] Field of Search ................................. 216/23, 24, 38, 216/41, 88; 349/42, 122

[56] References Cited

U.S. PATENT DOCUMENTS

| | | | |
|---|---|---|---|
| 5,486,485 | 1/1996 | Kim et al. | 437/41 |
| 5,585,951 | 12/1996 | Noda et al. | 349/122 |
| 5,637,187 | 6/1997 | Takasu et al. | 216/23 |

OTHER PUBLICATIONS

K. Kasahara, et al., "A Liquid–Crystal TV Display Panel Using a MOS Array with Gate–Bus Drivers," (1980) 1980 IEEE Biennial Display Research Conference, 96–101.

D. Burdeaux, et al., "Benzocyclobutene (BCB) Dielectrics for the Fabrication of High Density, Thin Film Multichip Modules," (1990) Journal of Electronic Materials 19: 1357–1366.

N. Einspruch, et al. (Eds), VLSI Electronics–Microstructure Science, vol. 15.; pp. 293–343.

A. O'Hara, et al., "Mirror quality and efficiency improvements of reflective spatial light modulators by the use of dielectric coatings and chemical–mechanical polishing," (1993) Applied Optics, 32(28): 5549–5556.

I. Underwood, et al., "Improving the performance of liquid–crystal–over–silicon spatial light modulators: issues and achievements," (1994) Applied Optics, 33(14): 2768–2774.

D.J. McKnight, et al. "256×256 liquid–cyrstal–on–silicon spatial light modulator," (1994) Applied Optics, 33(14): 2775–2784.

T. Shimoto, et al. "High Density Multilayer Substrate Using Benzocyclobutene Dielectric," IMC 1992 Proceedings, Yokohama (1992), pp. 325–330.

B. Merriman, et al. (1989) Proc. 39th, ECC, p. 5.

*Primary Examiner*—William Powell
*Attorney, Agent, or Firm*—Fleshner & Kim

[57] ABSTRACT

A method for making an electro-optic device or electro-optic display system having enhanced performance over conventional flat-panel displays, wherein a planarizing polymeric resin layer is spin-cast on a flat-panel backplane containing pixel circuitry. The spin-cast layer is cured to provide a flat backplane. Vias are opened in the cured polymeric resin to each pixel. Metal is deposited to fill the vias and to form a confluent, overlying metal layer on the upper surface. The metal layer is patterned and etched to form individual mirrors over each pixel. The metal acts as both a switchable electrode and as a high aperture, highly reflective mirror over each pixel. Electro-optic devices which may be made using such a process are also disclosed.

31 Claims, 11 Drawing Sheets

ELECTRO-OPTICAL DEVICE AND METHOD

BACKGROUND OF THE INVENTION

1. Field of the Invention

The present invention relates generally to display systems, such as electro-optic or liquid crystal display systems. The present invention also relates to a method for enhancing the performance of reflective flat-panel displays. In particular, the invention relates to a method for planarizing the backplane of an electro-optic device. More particularly, the invention relates to a method for planarizing LCOS backplanes using a spin-cast polymeric resin, and to a device including a spin-cast polymeric resin planarized backplane.

2. Background of the Related Art

LCOS SLM's and microdisplays are made by sandwiching a thin layer of electro-optic material between an array of silicon chip circuits and an indium tin oxide coated coverglass. Incoming optical wavefronts are modulated by applying a voltage differential across the liquid crystal layer. LCOS devices have been successfully applied to coherent optical processors for a range of applications, and can also be used in various incoherent applications, such as image projection and head-up display systems.

In planarizing a backplane of a LCOS, or a silicon backplane, a dielectric layer is formed above the device circuitry. The dielectric layer above the device circuitry should be as flat as possible. Such a flat dielectric layer formed above the device circuitry provides a number of benefits or advantages to SLM's intended for coherent optical processing, as will be described fully hereinbelow.

The planarization of the backplane of an LCOS device was previously attempted by applying polyimide as the planarizing dielectric to a one-metal PMOS backplane. Vias (ca. 37 μm.) were wet-etched through the polyimide layer, and a Au-Ni alloy was evaporated to form a specular reflective mirror layer over the polyimide layer and in electrical contact with the first metal layer. (K. Kasahara, et al. (1980) 1980 IEEE Biennial Display Research Conference, 96–101).

The Degree of Planarization (DOP) may be used as a measure of the flatness or planarity of a surface, and may be used to compare the effectiveness of a planarization method, where DOP is given by the formula:

$$DOP = 1 - \frac{t \text{ after}}{t \text{ before}}$$

where $t_{before}$ is the step height of the surface before planarization, and $t_{after}$ is the step height after planarization. (See, for example, D. Burdeaux, et al. (1990) reference.) DOP values for polyimide planarization are typically in the range of only 18–30% (B. Merriman, et al. (1989) Proc. 39th ECC, 5). In addition to their relatively low DOP values, polyimide dielectric planarization layers are characterized by other problems, including water uptake and pinholing, leading to delamination of the planarizing layer and unintentional interconnection between metal layers. See, for example, N. Einspruch, et al. (Eds.) (1987) VLSI Electronics—Microstructure Science, Vol. 15, VLSI Metallization. The water uptake problem requires lengthy bake-out periods during processing. See, for example, D. Burdeaux, et al. (1990) J. Electronic Materials, 19: 1357–1366.

Chemical mechanical polishing (CMP) has also been used as a means for the planarization of the backplane of an LCOS device. According to CMP, a conformal dielectric layer, such as $SiO_2$, which has been deposited on the structures surface (by PECVD) may be flattened with a rotating pad and polishing slurry. CMP can achieve an extremely flat surface (see, for example, A. O'Hara, et al. (1993) Applied Optics, 32: 5549–5556. However, CMP has a number of significant disadvantages, including long processing times, the need to control many process variables, and the requirement of expensive equipment.

The present invention solves a significant problem in the art by providing a simplified method for planarization of LCOS devices, the method having a number of advantages, as will be described fully hereinbelow.

SUMMARY OF THE INVENTION

Accordingly, one object of the present invention is to provide an improved method for planarizing the backplane of a silicon substrate.

Another object of the invention is to provide a method for planarizing the backplane of a silicon substrate without the need for chemical mechanical polishing.

Another object of the invention is to provide a method for planarizing the backplane of a silicon substrate with a spin-cast layer of polymeric resin.

Another object of the invention is to provide a method for fabricating an electro-optic device having a spin-cast dielectric planarizing layer on at least one metal layer.

Another object of the invention is to provide a method for fabricating an electro-optic device having a spin-cast dielectric planarizing layer on at least one metal layer, and an additional layer of metal on the spin-cast dielectric planarizing layer, wherein the additional layer of metal is electrically connected to the at least one metal layer.

Another object of the invention is to provide an electro-optic device having a spin-cast dielectric planarizing layer on at least one metal layer.

Another object of the invention is to provide an electro-optic device having a spin-cast dielectric planarizing layer on at least one metal layer, and an additional layer of metal on the spin-cast dielectric planarizing layer, wherein the additional layer of metal is electrically connected to the at least one metal layer.

One advantage of the present invention is that it provides a process for planarizing a flat-panel backplane containing pixel circuitry.

Another advantage of the invention is that it provides a method for planarizing a silicon substrate backplane without the need for chemical mechanical polishing.

Another advantage of the invention is that it provides a method for planarizing a flat-panel backplane in which a polymeric resin is spin-cast over pixel circuitry.

Another advantage of the invention is that it provides a method for making an electro-optic device in which a metal layer is disposed on a spin-cast polymeric resin planarizing layer.

Another advantage of the invention is that it provides a method for making an electro-optic device including one or more pixels in which a metal layer, disposed on a spin-cast polymeric resin planarizing layer, is patterned and etched to form individual mirrors over each pixel.

Another advantage of the invention is that it provides a flat-panel display including polymeric resin which is spin-cast over pixel circuitry.

Another advantage of the invention is that it provides an electro-optic device in which a metal layer is disposed on a spin-cast polymeric resin planarizing layer.

Another advantage of the invention is that it provides an electro-optic device including one or more pixels in which a metal layer, disposed on a spin-cast polymeric resin planarizing layer, is patterned and etched to form individual mirrors over each pixel.

One feature of the invention is that it provides a method for planarizing a silicon substrate backplane, the method including spin-casting a polymeric resin planarizing layer over a first electrode including at least one metal layer.

Another feature of the invention is that it provides a method for making an electro-optic device, the device including a spin-cast polymeric resin.

Another feature of the invention is that it provides an electro-optic device, the device including a spin-cast polymeric resin planarizing dielectric layer disposed between a laminate metal electrode.

These and other advantages, objects, and features of the invention are accomplished by the provision of a method for forming a pixel for an electro-optic display, including the steps of depositing an underlying metal layer on a silicon substrate; depositing a first photoresist layer on the underlying metal layer; patterning the first photoresist layer; developing the patterned first photoresist layer; wet or dry etching the underlying metal layer; removing the first photoresist layer; spin-casting a polymeric resin layer on the underlying metal layer; curing the polymeric resin layer; depositing a hard mask on the cured polymeric resin layer; depositing a second photoresist layer on the hard mask; patterning the second photoresist layer; developing the second photoresist layer; wet or dry etching the hard mask; removing the second photoresist layer; dry etching the cured polymeric resin layer; removing the hard mask; depositing an overlying metal layer on the dry etched polymeric resin layer; depositing a third photoresist layer on the overlying metal layer; patterning the third photoresist layer; developing the third photoresist layer; etching the overlying metal layer; and removing the third photoresist layer.

These and other advantages, objects, and features of the invention are accomplished by the provision of a method for polymeric resin backplane planarization of a LCOS device, including the steps of: providing a substrate including an underlying metal layer; spin-casting a planarizing layer on the underlying metal layer; curing the planarizing layer to form a layer of cured polymeric resin; depositing a hard mask on the cured polymeric resin layer; depositing a first photoresist layer on the hard mask; patterning the first photoresist layer; developing the first photoresist layer; wet or dry etching the hard mask; removing the first photoresist layer; dry etching the cured polymeric resin layer; removing the hard mask; depositing an overlying metal layer; depositing a second photoresist layer on the overlying metal layer; patterning the second photoresist layer; developing the second photoresist layer; etching the overlying metal layer; and removing the second photoresist layer.

These and other advantages, objects, and features of the invention are accomplished by the provision of a method for making an electro-optic device, the method including the steps of providing a substrate having pixel circuitry disposed thereon; providing an underlying first metal layer on the pixel circuitry; providing an underlying second metal layer disposed on the underlying first metal layer, wherein the underlying second metal layer is in electrical contact with the underlying first metal layer; providing a passivation layer on the underlying second metal layer; spin-casting a planarizing polymeric resin layer on the passivation layer; curing the planarizing polymeric resin layer at an elevated temperature; dry etching the planarizing polymeric resin layer; depositing an overlying metal layer on the dry etched spin-cast planarizing polymeric resin layer, wherein the overlying metal layer is in electrical contact with the underlying second metal layer, and wherein the underlying first metal layer, the underlying second metal layer, and the overlying metal layer comprise a first electrode of the electro-optic device; and etching the overlying metal layer.

These and other advantages, objects, and features of the invention are accomplished by the provision of a method for making an electro-optic device having at least one pixel, the method including the steps of: providing a substrate having pixel circuitry disposed thereon; providing an underlying first metal layer on the pixel circuitry; providing an underlying second metal layer disposed on the underlying first metal layer, wherein the underlying second metal layer is in electrical contact with the underlying first metal layer; providing a passivation layer on the underlying second metal layer; spin-casting a planarizing polymeric resin layer on the passivation layer; curing the planarizing polymeric resin layer at an elevated temperature; depositing a hard mask on the planarizing polymeric resin layer; coating a photoresist on the hard mask; patterning the photoresist; developing the photoresist; wet or dry etching the hard mask; removing the photoresist; and dry etching the planarizing polymeric resin layer; removing the hard mask; depositing an overlying metal layer on the dry etched spin-cast planarizing polymeric resin layer, wherein the overlying metal layer is in electrical contact with the underlying second metal layer, and wherein the underlying first metal layer, the underlying second metal layer, and the overlying metal layer comprise a first electrode of the electro-optic device; and etching the overlying metal layer.

These and other advantages, objects, and features of the invention are accomplished by the provision of a method for making an electro-optic device including at least one pixel, including the steps of: providing a substrate having pixel circuitry disposed thereon; providing an underlying metal layer on the pixel circuitry; providing a passivation layer on the underlying metal layer; spin-casting a planarizing polymeric resin layer on the passivation layer; curing the planarizing polymeric resin layer; dry etching the planarizing polymeric resin layer; depositing an overlying metal layer on the dry etched spin-cast planarizing polymeric resin layer, wherein the overlying metal layer is in electrical contact with the underlying metal layer, and wherein the underlying metal layer and the overlying second metal layer comprise a first electrode of the electro-optic device; and etching the overlying metal layer.

These and other advantages, objects, and features of the invention are accomplished by the provision of an electro-optic device, including: a substrate; circuitry disposed on the substrate; an underlying first metal layer disposed on the circuitry; an underlying second metal layer disposed on the underlying first metal layer, wherein the underlying second metal layer is in electrical contact with the underlying first metal layer; a passivation layer disposed on the underlying second metal layer; a spin-cast planarizing layer of polymeric resin disposed on the passivation layer; an overlying metal layer disposed on the spin-cast planarizing layer of polymeric resin, wherein the overlying metal layer is in electrical contact with the underlying second metal layer, and wherein the underlying first metal layer, the underlying second metal layer, and the overlying metal layer comprise a first electrode of the electro-optic device.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

The above references are incorporated by reference herein where appropriate for appropriate teachings of additional or alternative details, features and/or technical background.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

The above references are incorporated by reference herein where appropriate for appropriate teachings of additional or alternative details, features and/or technical background.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

The invention will be described in detail with reference to the following drawings, wherein.

DETAILED DESCRIPTION OF PREFERRED EMBODIMENTS

Figure 1A:
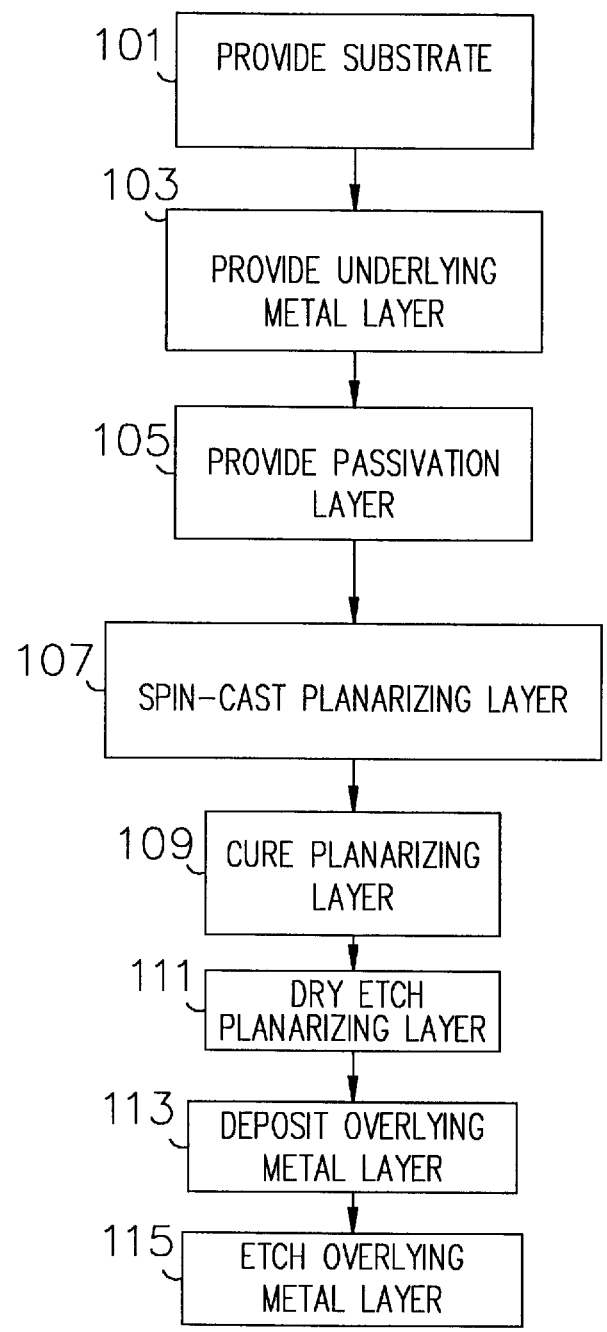
FIG. 1A shows the steps involved in a method for spin-cast polymeric resin planarization of silicon backplanes, according to one embodiment of the invention.

The preferred embodiments of an improved electro-optic device and method therefore, according to the present invention, will now be described with reference to the accompanying drawings.

During the planarization of a silicon backplane, a flat dielectric layer is formed above the device circuitry. This layer provides several benefits for SLM's intended for coherent optical processing, including increased pixel fill-factor, and flat-fill factor (i.e. the portion of a pixel-mirror which is reflective and flat) and a flatter upper surface on which to deposit a smooth, highly reflective mirror layer. By way of example, the zeroth order diffraction efficiency, $\eta d$, of a LCOS device can be written as:

$$\eta d = r^2 \beta^2,$$

where r is the pixel reflectivity and B is the pixel flat-fill factor. A typical correlator requires two cascaded SLM's, which reduces the usable optical output signal by $\eta^2 d$. See, for example, J. D. McKnight, et al. (1994) Applied Optics, 33: 2775–2784. If the pixel reflectivity and flat-fill factor are increased from 80% to 90%, and 62% to 85%, respectively, the usable optical output signal, N2d, changes from 6% to 34%, a five fold increase in efficiency. These factors have a significant impact on the selection of source illumination and detector technology implemented in a correlator, and hence provide advantages of allowing the use of diode lasers and low efficiency detectors in place of gas lasers and high efficiency detectors.

A flat dielectric layer also has benefits for image display devices. These benefits include: higher aperture ratio and reflectivity pixel mirrors which increases the device's optical efficiency and light shielding; extra underlying metal layers which accomplish interpixel shielding, as well as low resistance addressing lines; the potential for non-light-scattering, complex pixel structures (e.g. SRAM elements), providing enhanced display functionality; and improvement in liquid crystal alignment layer uniformity, presenting a more uniform image to the observer. See, for example, I. Underwood, et al. (1994) Applied Optics, 33: 2768–2774.

Previous efforts at planarization of silicon backplanes have focused on chemical mechanical polishing (CMP), which is costly and time consuming due to its requirements for expensive equipment, long processing times, and the control of many process variables. In contrast, the instant invention provides a method for planarization of silicon backplanes, utilizing spin-cast planarizing polymeric resins, wherein production time, process variability, and equipment costs are reduced, as compared with CMP planarization methods.

By way of introduction, a method for making an electro-optic device or liquid crystal display system according to the invention may be summarized as follows. A planarizing polymeric resin layer is spin-cast on a flat-panel backplane containing pixel circuitry. The spin-cast polymeric resin layer is cured to form a spin-cast flat surface of the polymeric resin layer, the spin-cast flat surface providing a flat backplane. Vias are opened in the cured polymeric resin to each pixel. Metal is deposited to fill the vias to form an overlying metal layer on the planarized polymeric resin layer. The metal layer is patterned and may be wet or dry etched to form an individual mirror over each pixel. The metal layer acts as both a switchable electrode, and as a high aperture, highly reflective mirror over each pixel.

According to the invention, a method for planarization of silicon backplanes using a polymeric resin includes spin-casting or spin-coating the resin, or a resin precursor or prepolymer solution of the resin, onto a device wafer or silicon substrate, and curing the planarizing resin layer or coating. Herein the terms "substrate", "silicon substrate", and "wafer" may be used interchangeably.

The steps involved in a method for spin-cast polymeric resin planarization of silicon backplanes according to one embodiment of the invention are summarized in FIG. 1A, wherein step 101 involves providing a substrate having pixel circuitry disposed thereon. Step 103 involves providing an underlying metal layer on the pixel circuitry. Step 105 involves providing a passivation layer on the underlying metal layer. Step 107 involves spin-casting a planarizing polymeric resin layer on the passivation layer. Step 109 involves curing the planarizing polymeric resin layer. Step 107 and/or step 109 includes the formation of a spin-cast flat surface on the planarizing polymeric resin layer. Step 111 involves dry etching the planarizing polymeric resin layer. Step 113 involves depositing an overlying metal layer on the dry etched spin-cast planarizing polymeric resin layer, wherein the overlying metal layer is in electrical contact with the underlying metal layer, and wherein the underlying metal layer and the overlying second metal layer comprise a first electrode of the electro-optic device. Finally step 115 involves etching the overlying metal layer. According to the invention, a similar method to that described with regard to FIG. 1A may omit the step 105 of providing a passivation layer on the underlying metal layer, the former layer being optional according to the invention. In the case where no passivation layer is provided, the spin-cast planarizing polymeric resin layer may be spin-cast on the underlying metal layer.

Figure 1B:
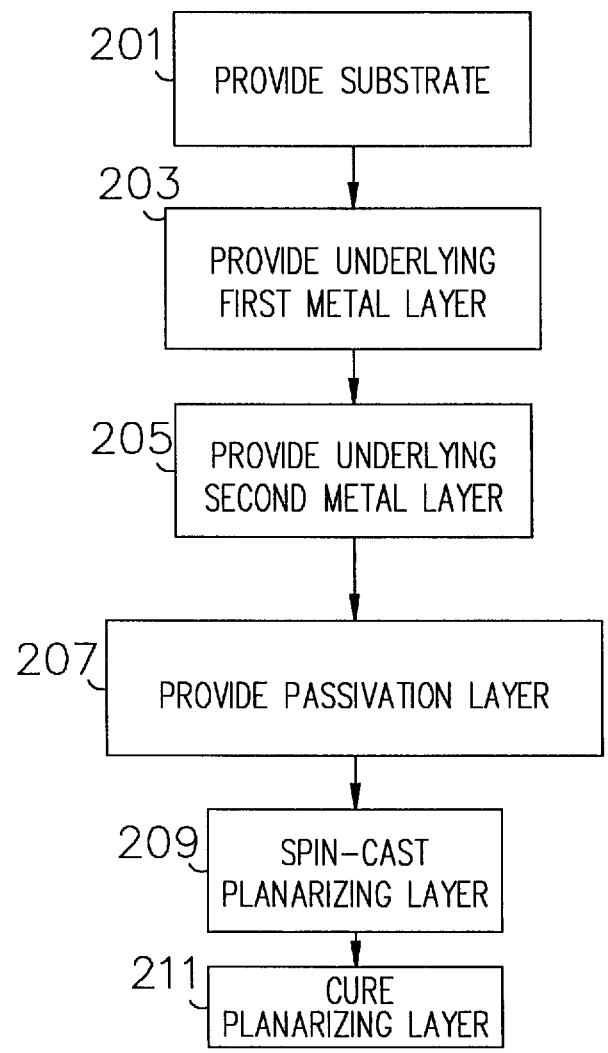
FIG. 1B schematically represents a series of steps involved in a method for making an electro-optic device including at least one pixel, according to another embodiment of the invention.

FIG. 1B schematically represents a series of steps involved in a method for making an electro-optic device including at least one pixel, according to another embodiment of the invention, wherein step 201 involves providing a substrate having pixel circuitry disposed thereon. Step 203 involves providing an underlying first metal layer on the pixel circuitry. Step 205 involves providing an underlying second metal layer disposed on the underlying first metal layer, wherein the underlying second metal layer is in electrical contact with the underlying first metal layer and the underlying first metal layer and the underlying second metal layer comprise a first electrode of the electro-optic device. Step 207 involves providing a passivation layer on the underlying second metal layer. Step 209 involves spin-casting a planarizing polymeric resin layer on the passivation layer. Finally, step 211 involves curing the planarizing polymeric resin layer. Step 209 and/or step 211 includes the formation of a spin-cast flat surface on the planarizing polymeric resin layer. According to the invention, a similar method to that described with regard to FIG. 1B may omit the step 207 of providing a passivation layer on the underlying second metal layer, the former layer being optional according to the invention. In the case where no passivation layer is provided, the spin-cast planarizing polymeric resin layer may be spin-cast on the underlying second metal layer. However, when a passivation layer is provided, the passivation layer is selectively removed, for example by a wet- or more commonly a dry etching process, in order to allow localized contact with the underlying second metal layer.

Figure 1C:
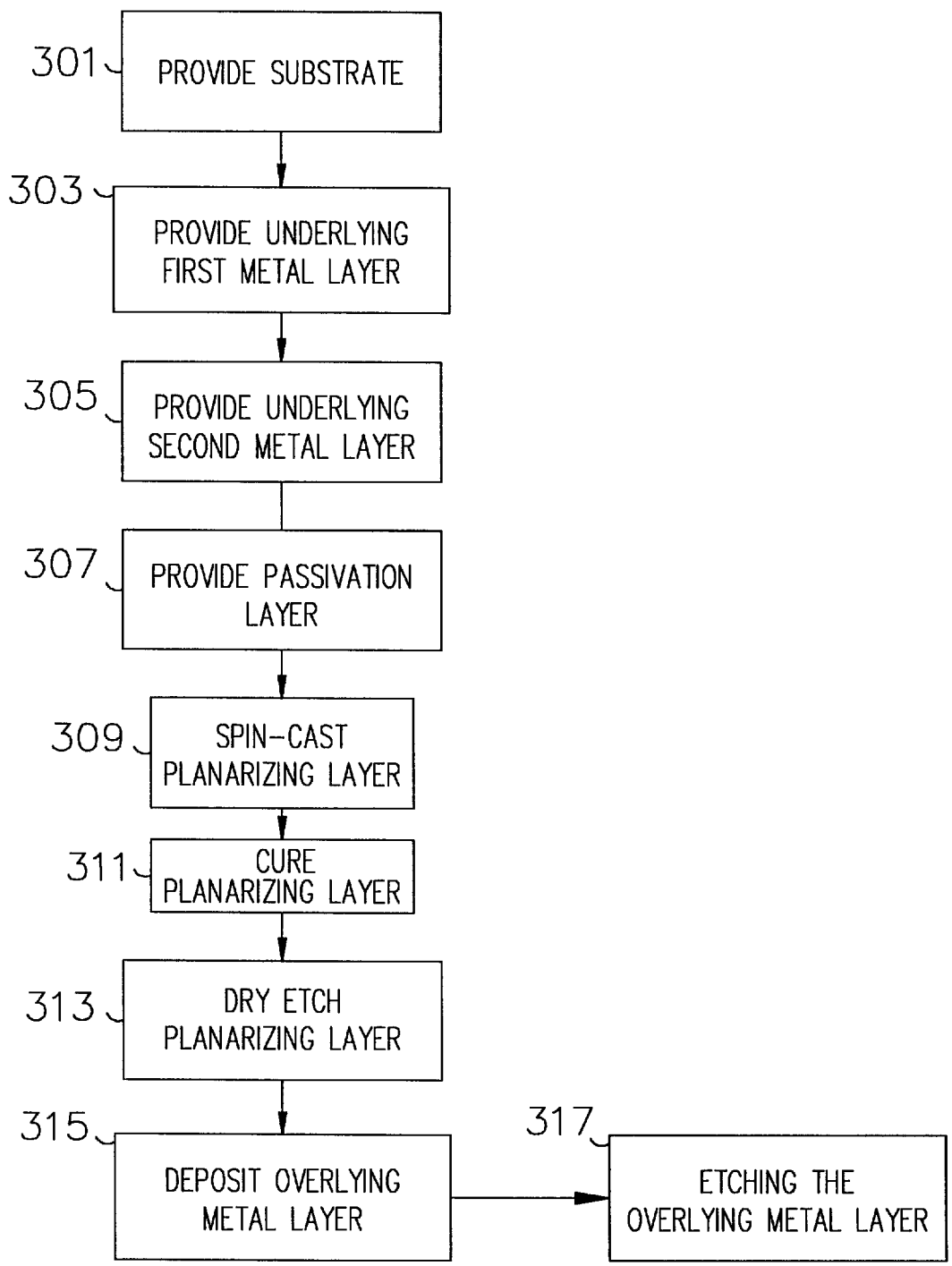
FIG. 1C schematically represents a series of steps involved in a method for making an electro-optic device including at least one pixel, according to another embodiment of the invention.
Figure 1D:
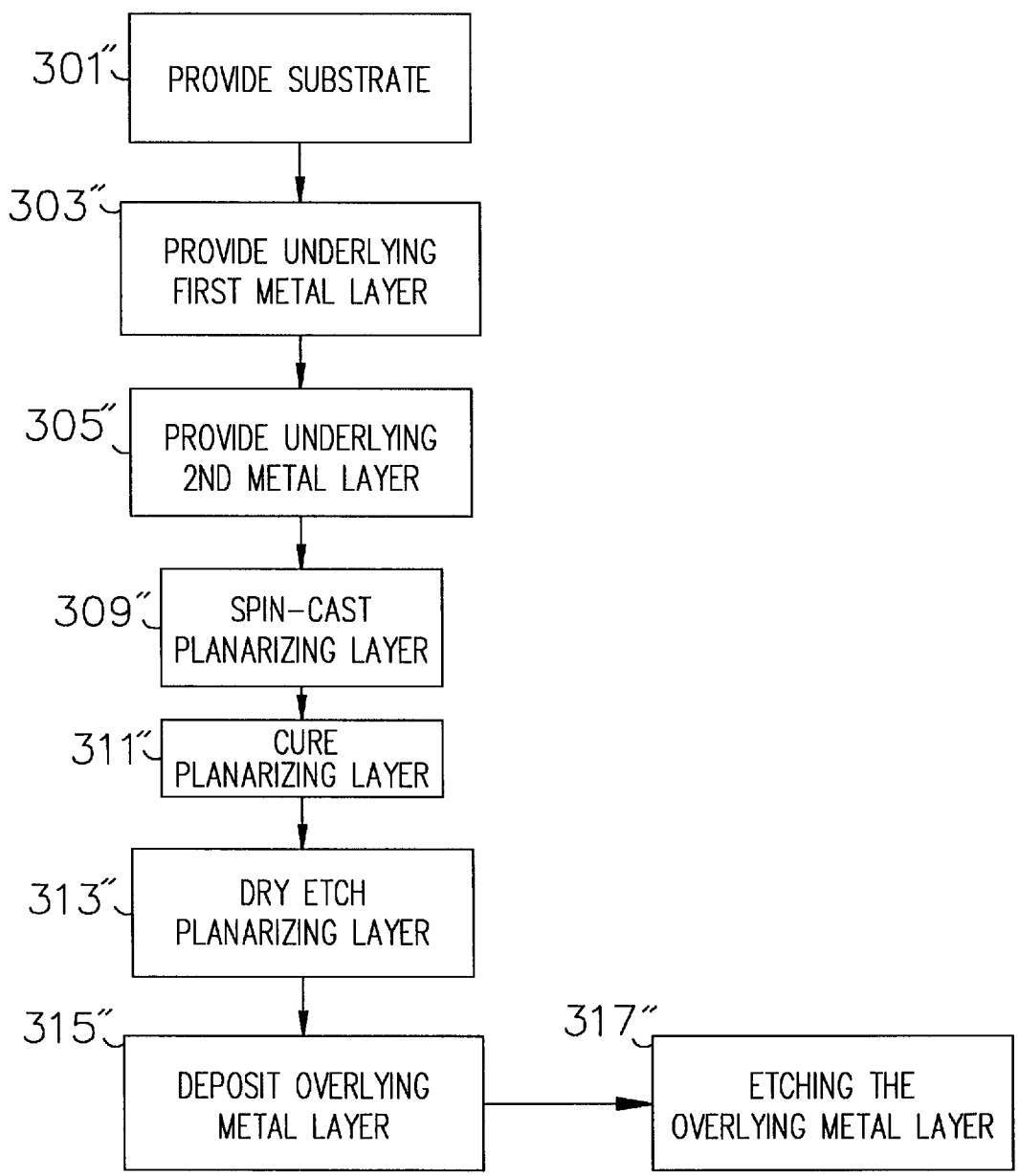
FIG. 1D schematically represents a series of steps involved in a method for making an electro-optic device including at least one pixel, according to another embodiment of the invention.

FIG. 1C schematically represents a series of steps involved in a method for making an electro-optic device including at least one pixel, wherein step 301 involves providing a substrate having pixel circuitry disposed thereon. Step 303 involves providing an underlying first metal layer on the pixel circuitry. Step 305 involves providing an underlying second metal layer disposed on the underlying first metal layer, wherein the underlying second metal layer is in electrical contact with the underlying first metal layer. Step 307 involves providing a passivation layer on the underlying second metal layer. Step 309 involves spin-casting a planarizing polymeric resin layer on the passivation layer. Step 311 involves curing the planarizing polymeric resin layer at an elevated temperature. Step 309 and/or step 311 includes the formation of a spin-cast flat surface on the planarizing polymeric resin layer. Step 313 involves dry etching the planarizing polymeric resin layer. Step 315 involves depositing an overlying metal layer on the dry etched spin-cast planarizing polymeric resin layer, wherein the overlying metal layer is in electrical contact with the underlying second metal layer, and wherein the underlying first metal layer, the underlying second metal layer, and the overlying metal layer comprise a first electrode of the electro-optic device. Finally, step 317 involves etching the overlying metal layer. According to the invention, a similar method to that described with regard to FIG. 1C may omit the step 307 of providing a passivation layer on the underlying second metal layer, the former layer being optional according to the invention (FIG. 1D). In the case where no passivation layer is provided, the spin-cast planarizing polymeric resin layer may be spin-cast on the underlying second metal layer. However, when a passivation layer is provided, the passivation layer is selectively removed, for example by a dry etching process, in order to allow localized contact between the underlying second metal layer and the overlying metal layer.

FIG. 1D schematically represents a series of steps involved in a method for making an electro-optic device including at least one pixel, wherein step 301" involves providing a substrate having pixel circuitry disposed thereon. Step 303" involves providing an underlying first metal layer on the pixel circuitry. Step 305" involves providing an underlying second metal layer disposed on the underlying first metal layer, wherein the underlying second metal layer is in electrical contact with the underlying first metal layer. Step 309" involves spin-casting a planarizing polymeric resin layer on the underlying second metal layer. Step 311" involves curing the planarizing polymeric resin layer at an elevated temperature. Step 309" and/or step 311" includes the formation of a spin-cast flat surface on the planarizing polymeric resin layer. Step 313" involves dry etching the planarizing polymeric resin layer. Step 315" involves depositing an overlying metal layer on the dry etched spin-cast planarizing polymeric resin layer, wherein the overlying metal layer is in electrical contact with the underlying second metal layer, and wherein the underlying first metal layer, the underlying second metal layer, and the overlying metal layer comprise a first electrode of the electro-optic device. Finally, step 317" involves etching the overlying metal layer.

Figure 2:
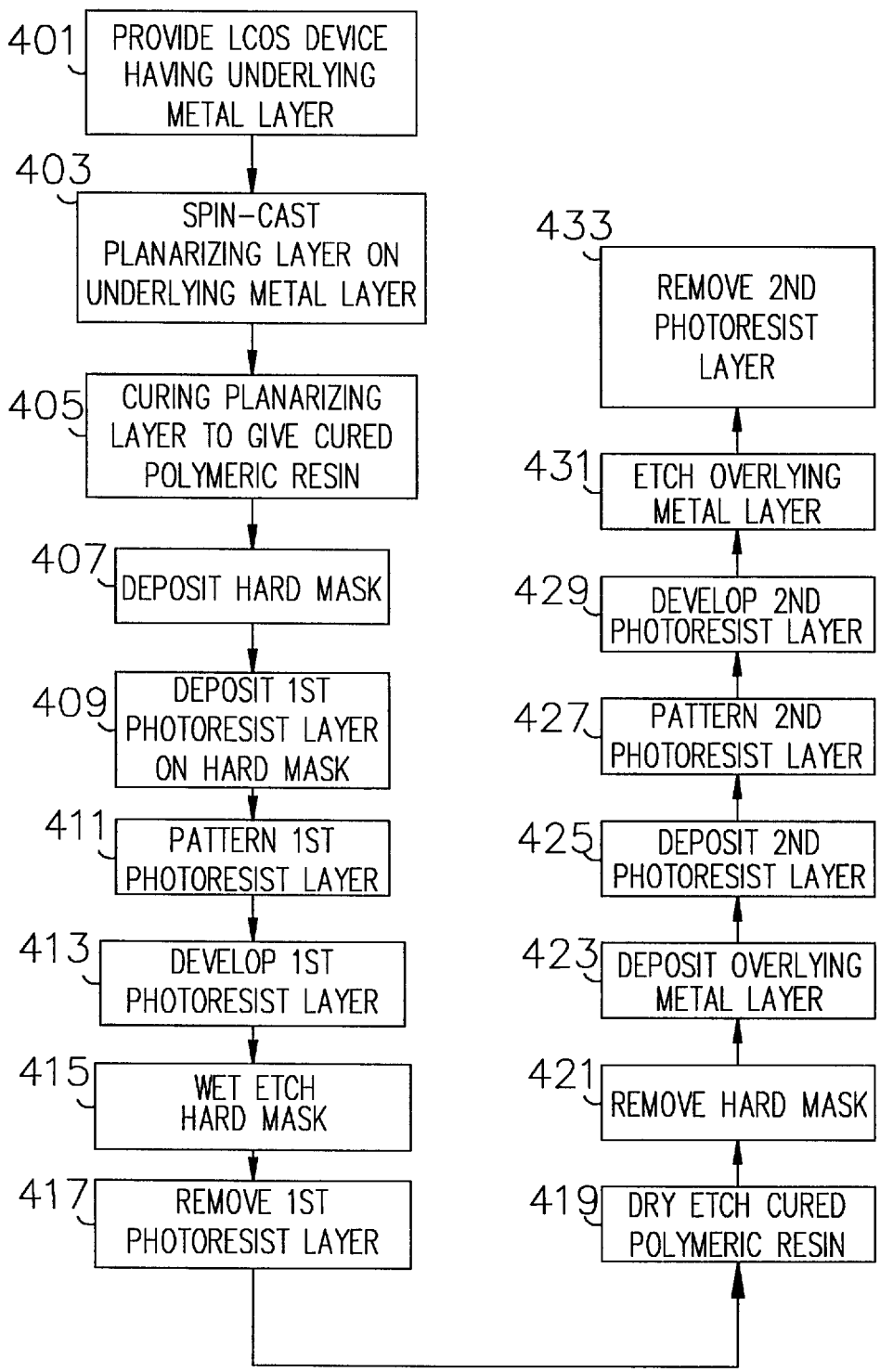
FIG. 2 schematically represents a series of steps involved in a method for polymeric resin backplane planarization of a LCOS device, according to another embodiment of the invention.

FIG. 2 schematically represents a series of steps involved in a method for polymeric resin backplane planarization of a LCOS device, according to another embodiment of the invention, wherein step 401 involves providing a substrate including an underlying metal layer. Step 403 involves spin-casting a planarizing layer on the underlying metal layer. Step 405 involves curing the planarizing layer to form a layer of cured polymeric resin. Step 403 and/or step 405 includes the formation of a spin-cast flat surface on the planarizing polymeric resin layer. Step 407 involves depositing a hard mask on the cured polymeric resin layer. Step 409 involves depositing a first photoresist layer on the hard mask. Step 411 involves patterning the first photoresist layer. Step 413 involves developing the first photoresist layer. Step 415 involves wet or dry etching the hard mask. Step 417 involves removing the first photoresist layer. Step 419 involves dry etching the cured polymeric resin layer. Step 421 involves removing the hard mask. Step 423 involves depositing an overlying metal layer. Step 425 involves depositing a second photoresist layer on the overlying metal layer. Step 427 involves patterning the second photoresist layer. Step 429 involves developing the second photoresist layer. Step 431 involves etching the overlying metal layer. Finally, step 433 involves removing the second photoresist layer.

Figure 3:
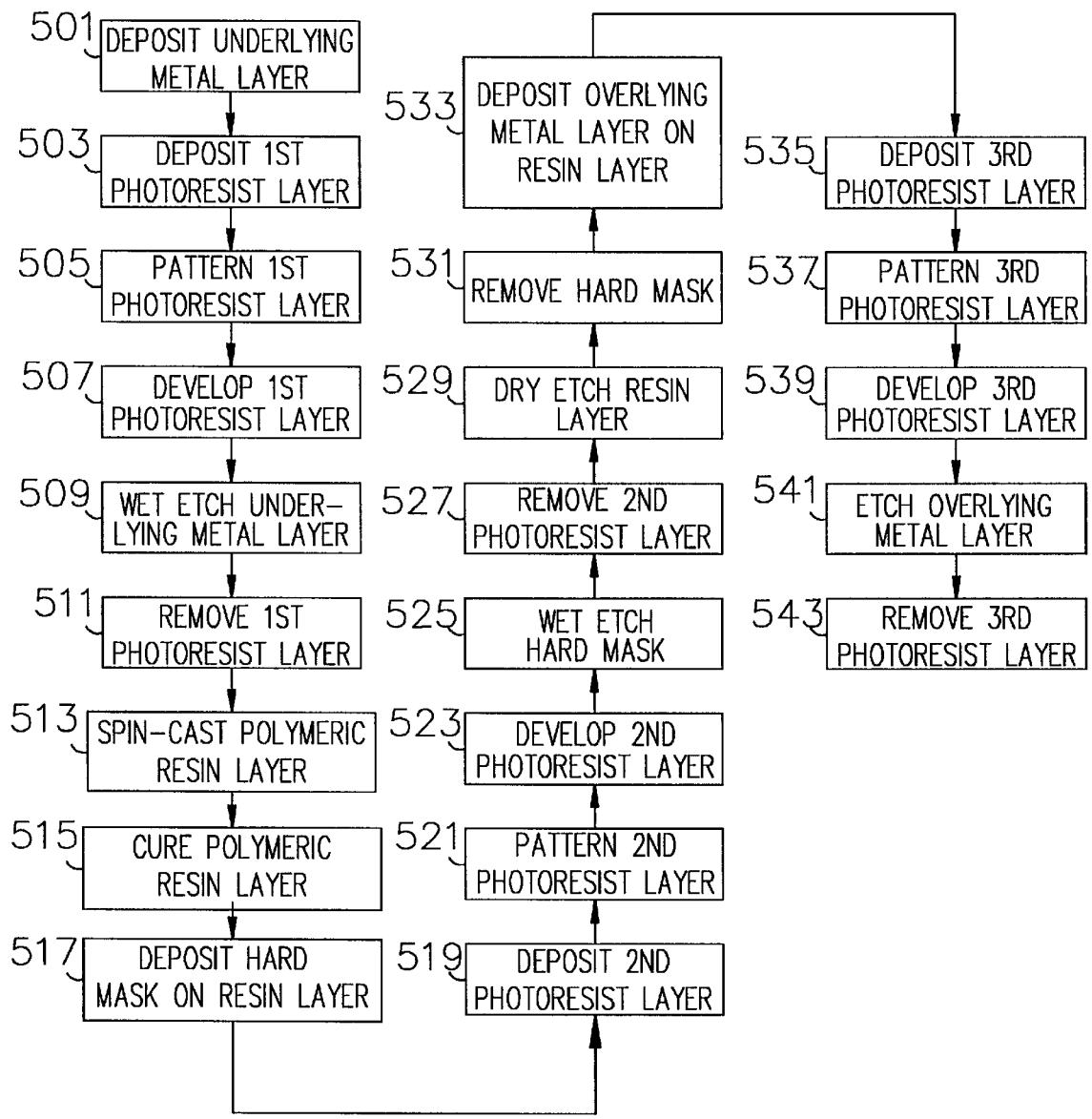
FIG. 3 schematically represents a series of steps involved in a method for forming a pixel for an electro-optic display, according to another embodiment of the invention.

FIG. 3 schematically represents a series of steps involved in a method for forming a pixel for an electro-optic display, according to another embodiment of the invention, wherein step 501 involves depositing an underlying metal layer on a silicon substrate. Step 503 involves depositing a first photoresist layer on the underlying metal layer. Step 505 involves patterning the first photoresist layer. Step 507 involves developing the patterned first photoresist layer. Step 509 involves wet or dry etching the underlying metal layer. Step 511 involves removing the first photoresist layer. Step 513 involves spin-casting a polymeric resin layer on the underlying metal layer. Step 515 involves curing the polymeric resin layer. Step 513 and/or step 515 includes the formation of a spin-cast flat surface on the planarizing polymeric resin layer. Step 517 involves depositing a hard mask on the cured polymeric resin layer. Step 519 involves depositing a second photoresist layer on the hard mask. Step 521 involves patterning the second photoresist layer. Step 523 involves developing the second photoresist layer. Step 525 involves wet or dry etching the hard mask. Step 527 involves removing the second photoresist layer. Step 529 involves dry etching the cured polymeric resin layer. Step 531 involves removing the hard mask. Step 533 involves depositing an overlying metal layer on the dry etched polymeric resin layer. Step 535 involves depositing a third photoresist layer on the overlying metal layer. Step 537 involves patterning the third photoresist layer. Step 539 involves developing the third photoresist layer. Step 541 involves etching the overlying metal layer. Finally, step 543 involves removing the third photoresist layer.

The various processing limitations and/or elements described hereinbelow may be applicable to each of the embodiments of the invention as outlined above with reference to FIGS. 1A–C, 2, and 3, unless otherwise specified.

Coating or layer thickness of the resin on the device wafer may be controlled by wafer spin speed during the spin-coating step, and by appropriately selecting the concentration of the prepolymer in a prepolymer solution. The curing process includes polymerization of the resin, and may be achieved for example by the application of heat, such as heat from an oven or a hotplate.

A preferred planarizing polymeric resin according to the invention includes a polymer of a monomeric molecule consisting entirely of carbon, hydrogen, and oxygen. More preferably, a planarizing polymeric resin according to the invention consists of an aromatic resin polymer. Most preferably, a planarizing polymeric resin according to the invention is a polymer of benzocyclobutene or bisbenzocyclobutene. Herein benzocyclobutene, bisbenzocyclobutene, and polymeric bisbenzocyclobutene may be used interchangeably and may each be abbreviated as BCB.

According to the invention, a preferred planarizing polymeric resin layer includes a spin-cast polymeric resin consisting entirely of the elements carbon, hydrogen, and oxygen. A more preferred planarizing polymeric resin layer includes a spin-cast layer of polymeric bisbenzocyclobutene. Preferably the spin-cast flat surface of the planarizing polymeric resin layer provides a planar surface of polymeric bisbenzocyclobutene which does not require buffing or polishing (e.g. by CMP) and which has a DOP of at least 80%. A preferred overlying metal layer includes a layer of Al. More preferably, the overlying metal layer consists of pure Al having a purity of at least 99% Al by weight, and has a thickness of about 5,000 Å.

A DOP value exceeding 80% may be achieved with a BCB planarizing layer having a thickness twice the largest step height of the layer to be planarized. This is consistent with previous findings (see, for example, T. Shimoto, et al., (1992) IMC 1992 Proceedings, Yokohama). Under the invention, BCB coatings having a thickness in the range of about 1–3 μm may be used for planarizing the backplanes of LCOS devices. Such a coating or layer thickness of BCB may be achieved by spin-casting a prepolymer solution including 35% BCB by weight in mesitylene at a spin rate of 1000 rpm.

The polymerization of BCB is a thermally activated ring opening and cross-linking of the BCB monomer molecule. Curing may be achieved by maintaining the spin-cast coating at an elevated temperature for a defined period of time in an inert atmosphere. By inert atmosphere is meant an atmosphere, for example of air, with a substantially reduced oxygen content. An inert atmosphere is required to prevent oxidation of the film. Preferably the oxygen content of the inert atmosphere will not exceed 100 ppm oxygen. Preferably the elevated temperature during the curing stage is at least 200° C., and more preferably the temperature is at least 250° C. Preferably the elevated temperature during the BCB curing stage is maintained for between 3 and 10 minutes. A preferred temperature/time regime for curing BCB according to the invention is a temperature greater than about 250° C. for a period of about 5 minutes. Under these conditions, a planarizing layer having greater than 90% of the BCB monomer polymerized is obtained. Cured BCB forms a glassy thermoset, with no catalysts or volatiles produced during the cure.

According to the invention, a planarizing polymeric resin layer over a metal underlying layer or layers may be etched to form vias, or holes, by which a metal overlying layer or layers may interconnect electrically or make electrical contact with the metal underlying layer(s). In this manner the underlying and overlying metal layers are at the same electrical potential and constitute a laminate first electrode. Herein, the terms "lower metal" layer(s) and "upper metal" layer(s) may be used interchangeably and synonymously with the terms "underlying metal" layer(s) and "overlying metal" layer(s), respectively. According to a preferred embodiment of the invention, a planarizing polymeric resin layer is disposed, or sandwiched, between an underlying first and an underlying second metal layer, on the one hand, and an overlying metal layer on the other, according to FIG. 1C (FIG. 5C). Underlying first and underlying second metal layers are themselves interconnected by vias. According to a preferred embodiment of the invention, a single via is formed or etched in the planarizing polymeric resin layer for each pixel of an electro-optic device or display.

In embodiments wherein the planarizing polymeric resin layer includes or constitutes a layer of BCB, fully cured BCP may be dry etched in fluorine-based plasmas. Average etch rates for fully cured BCP in a reactive ion etcher using $CF_4+O_2$ and $SF_6+O_2$ etch chemistries were approximately 0.21 and 0.25 $\mu$m per minute, respectively.

The formation of appropriate vias in the planarizing polymeric resin depends on suitable masking of the unetched areas of the planarizing polymeric resin layer. In determining a suitable masking method for a planarizing layer of BCB, criteria to be considered include: small critical dimensions in the masking layer, effective pattern transfer to the BCB, ease of removal of the masking layer, compatibility of the masking layer and method with mainline CMOS equipment, and the number of process steps involved. Two general categories of methods for masking a planarizing polymeric resin layer according to the invention are those using a hard mask layer, and those using a soft mask layer. Each of these categories will be described briefly as follows.

Figures 4A, 4B:
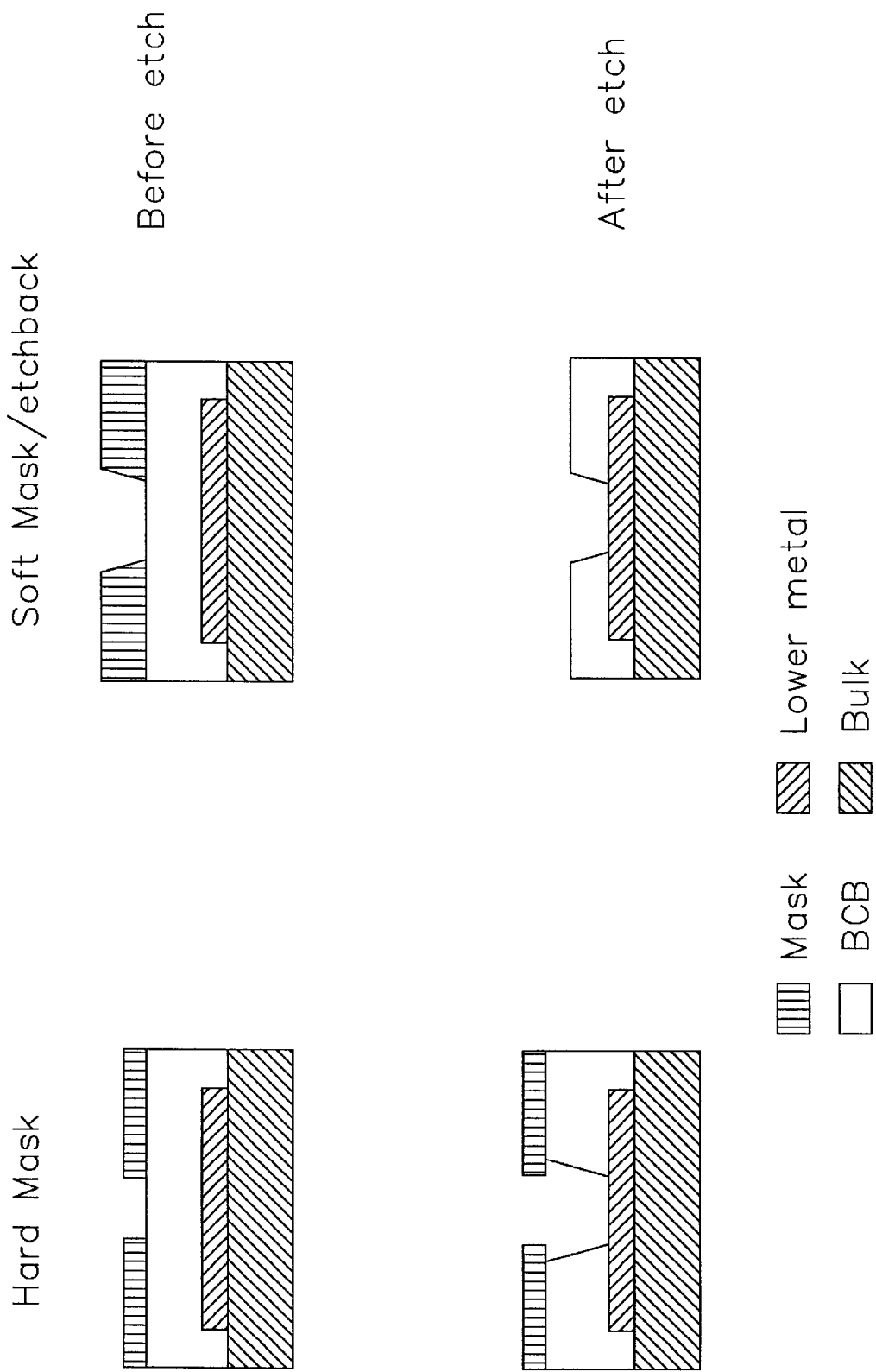
FIG. 4A schematically represents the relationship between the mask, the bisbenzocyclobutene layer, and the lower metal layer of an electro-optic device, before and after etching of the bisbenzocyclobutene layer using a hard mask, according to one embodiment of the invention.
FIG. 4B schematically represents the relationship between the mask, the bisbenzocyclobutene layer, and the lower metal layer of an electro-optic device, before and after etching of the bisbenzocyclobutene layer using a soft mask, according to another embodiment of the invention.

Hard masks are those masking layers which have a (dry) etch rate significantly lower than the etch rate of BCB, and which may be wet stripped after the dry etch process. The relationship between the mask, the BCB layer, and the lower metal layer before and after etching of the BCB layer using a hard mask is schematically represented in FIG. 4A. Hard mask layers of the prior art include layers of Cu, $SiO_2$, SiN, and Al. (Since $SiO_2$ and SiN are used as post-process passivation layers, their deposition equipment is often used to passivate wafers with materials not compatible with further processing in mainline CMOS equipment (e.g. gold). In contrast, a preferred hard mask layer according to the invention is a layer of Ti having a thickness ranging from about 300–3000 Å. A preferred thickness for a layer of Ti constituting a hard mask layer is about 1000 Å. Such a hard mask layer of Ti provides fine features. In addition, a Ti hard mask layer may be wet stripped after dry etching in $CF_4+O_2$. When a Ti hard mask layer is dry etched in $SF_6+O_2$ the thickness of the Ti layer may be optimized such that the etching of both the Ti layer and the vias in the BCB layer are completed at the same time, or at approximately the same time, thereby eliminating the need to wet strip the Ti layer after the dry etch.

Soft masks, such as photoresist, etch at approximately the same rate as the BCB layer. The relationship between the mask, the BCB layer, and the lower metal layer before and after etching of the BCB layer using a soft mask is schematically represented in FIG. 4B. A thin resist layer may be used to mask the areas surrounding each via. Preferably, the thickness of the thin resist layer is about 1 $\mu$m. Once the resist layer is consumed, the resulting BCB layer may be globally etched until the vias extend through the entire BCB layer to the underlying circuitry. The resist pattern is effectively transferred to the BCB layer, while some enlargement of the diameter of the vias may occur. In general, vias etched using a soft mask layer have larger diameters than those formed by hard masking.

According to one embodiment of the invention, after the BCB layer has been dry etched to form one or more vias, (at least one via per pixel), an overlying metal layer may be deposited on the planarized dielectric layer of the wafer or substrate to form a mirror layer. A preferred metal for deposition as the overlying or upper metal layer is aluminum, more preferably pure aluminum (i.e. >99% Al by weight). A preferred method of depositing the overlying metal on the planarized dielectric layer is sputter coating. The overlying metal layer of aluminum should be of a suitable thickness so as to provide adequate step coverage in the BCB vias, while maintaining a high reflectivity (ca. 87% or more), and low hillock formation, and may range from about 1000 Å to about 10,000 Å. Preferably the overlying metal layer of aluminum has a thickness in the range of from about 2,000 to about 8,000 Å, and more preferably a thickness of about 5,000 Å. (Problems associated with hillock formation in Al films are discussed, for example, by A. O'Hara et al., (1993) Applied Optics, 32:5549–5556.)

The overlying aluminum layer may be patterned and etched to provide a mirror over each individual pixel. Etching of the aluminum mirror layer may be performed by wet etching in an aluminum etchant, or by dry etching in a chlorine-based plasma. The overlying metal (eg. Al) layer is in electrical contact with the underlying metal layer via the vias in the planarizing dielectric layer, and thereby functions both as a switchable electrode and a high aperture highly reflective mirror over each pixel of the reflective flat-panel display/electro-optic device.

Via chains are made up of a series of upper and lower metal layer patterns which are connected to each other by vias which extend through, for example, the BCB planarizing layer. For example, a via chain may include an underlying, or lower, first metal layer over pixel circuitry on a substrate; an underlying, or lower, second metal layer over the underlying first metal layer and connected thereto by vias extending from the underlying second metal layer to the underlying first metal layer; a planarizing dielectric layer on the underlying second metal layer, the planarizing dielectric layer having vias therein; and an overlying or upper metal layer connected to the underlying or lower metal layer by the vias in the planarizing dielectric layer. The upper and lower metal layers are connected in links consisting of upper metal, via, and lower metal. The links connect together to form a chain. Current is passed through the chain to measure the chain's resistance. Low resistance chains imply good electrical contact between the upper metal, via, and lower metal. Via chains may be used as a test device for determining process reliability and performance.

Via pattern sizes (i.e. the diameter corresponding to the photoresist patterning) may range from about 1 $\mu$m to more than 5 $\mu$m. According to one embodiment of the invention, a preferred pattern size for LCOS pixels may be stated generally as being the smallest possible size concomitant with reliability (i.e. providing adequate electrical contact between metal layers). According to the instant invention, a 2 $\mu$m via diameter (photoresist pattern size) gave via diameters of ca. 3.6 $\mu$m and 4.4 $\mu$m, for the Ti hard mask and the soft mask (thin resist/etchback), respectively. Via resistance in an LCOS device according to the invention may be measured using test pads. A relatively low via resistance of 1 ohm or less per via indicates proper via dry etching and metal step coverage. The resistance across via chains having a length of 1,000 vias was determined to be 0.75 and 0.36 ohm for via chains formed using the Ti hard mask method and for those formed using the soft mask (thin resist/etchback) methods, respectively.

Figure 5A:
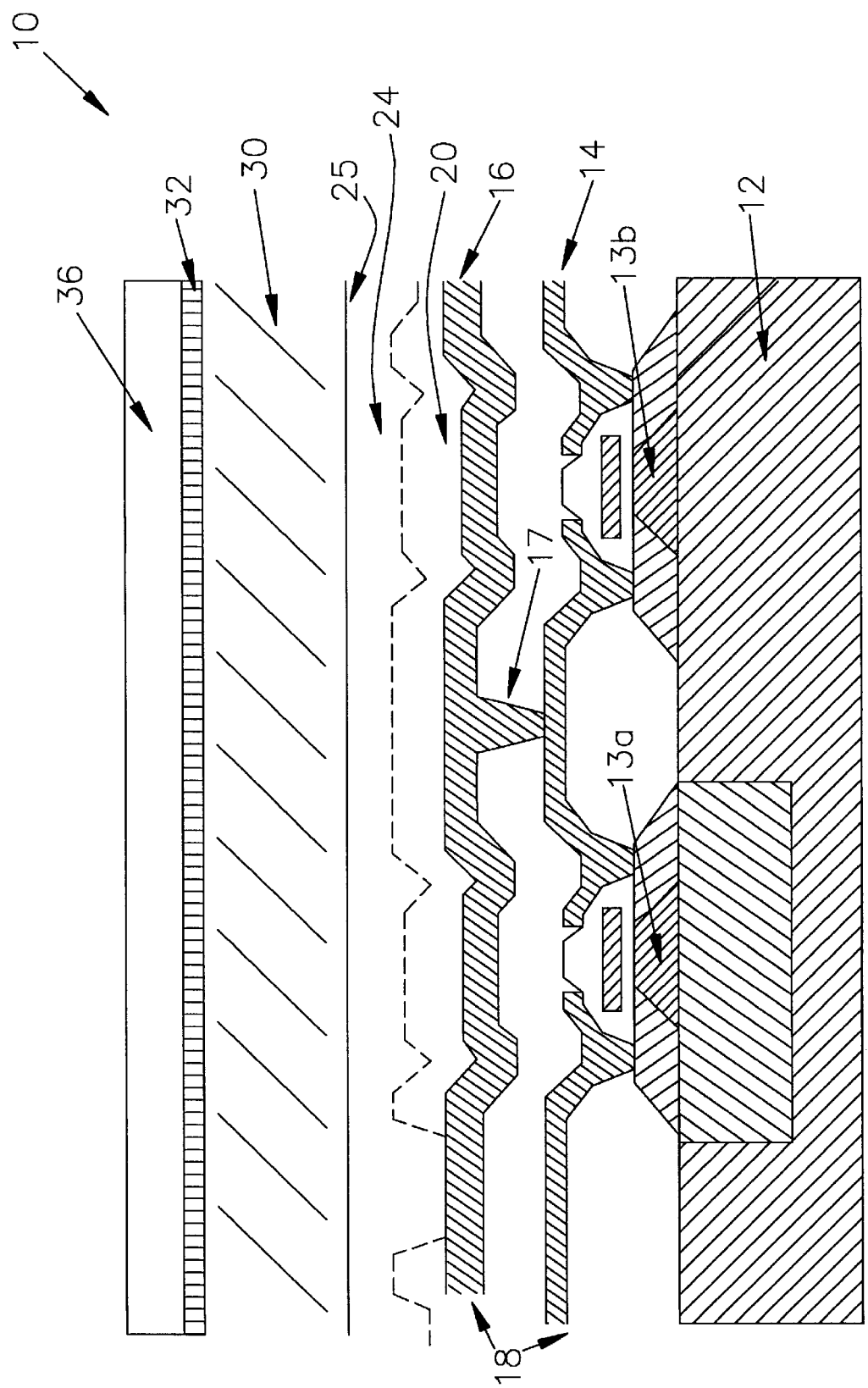
FIG. 5A is a cross-sectional view of an electro-optic device including a planarizing polymeric resin layer, according to one embodiment of the invention.

FIG. 5A shows a cross-sectional view of an electro-optic device 10, according to the invention, including a substrate 12, p-fet 13a, n-fet 13b, an underlying first metal layer 14, and an underlying second metal layer 16. Underlying second metal layer 16 makes electrical contact with underlying first metal layer 14 by via 17. Underlying first metal layer 14 and underlying second metal layer 16 together form lower, underlying, or lower electrode 18. A passivation layer 20 may optionally be disposed on underlying second metal layer 16. A planarizing layer 24 of polymeric resin may be disposed on passivation layer 20, when the latter layer is present, or alternatively planarizing layer 24 of polymeric resin may be disposed on underlying second metal layer 16. Planarizing layer is spin-cast and includes spin-cast flat surface 25. Spin-cast flat surface 25 is sufficiently planar (DOP ca. 83%) such that chemical mechanical polishing thereof is unnecessary. A layer of electro-optic material 30 is sandwiched between spin-cast flat surface 25 and a second electrode 32. An optically transmissive layer 36 is disposed over second electrode 32.

Figure 5B:
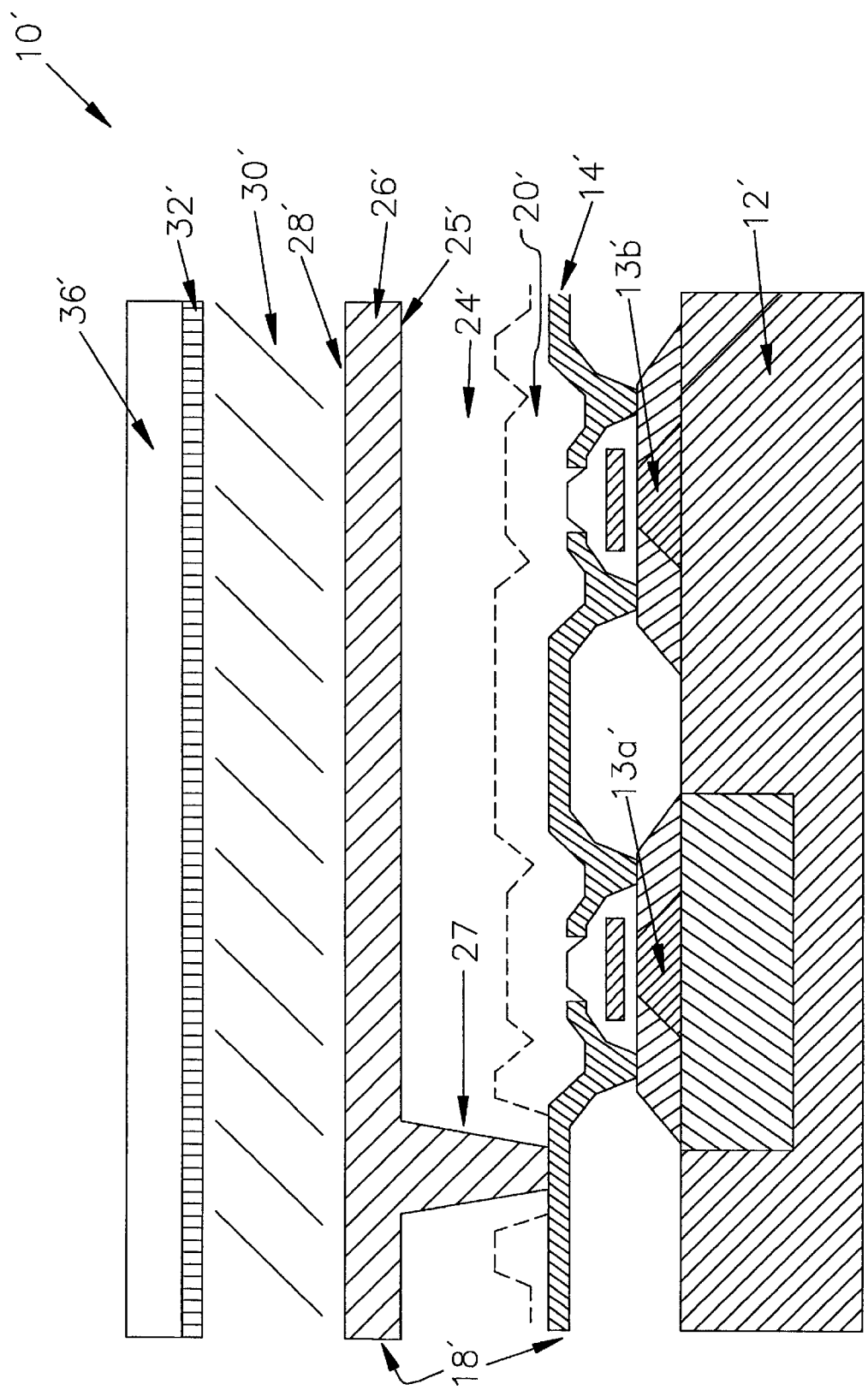
FIG. 5B is a cross-sectional view of an electro-optic device including a planarizing polymeric resin layer, according to another embodiment of the invention.
Figure 5C:
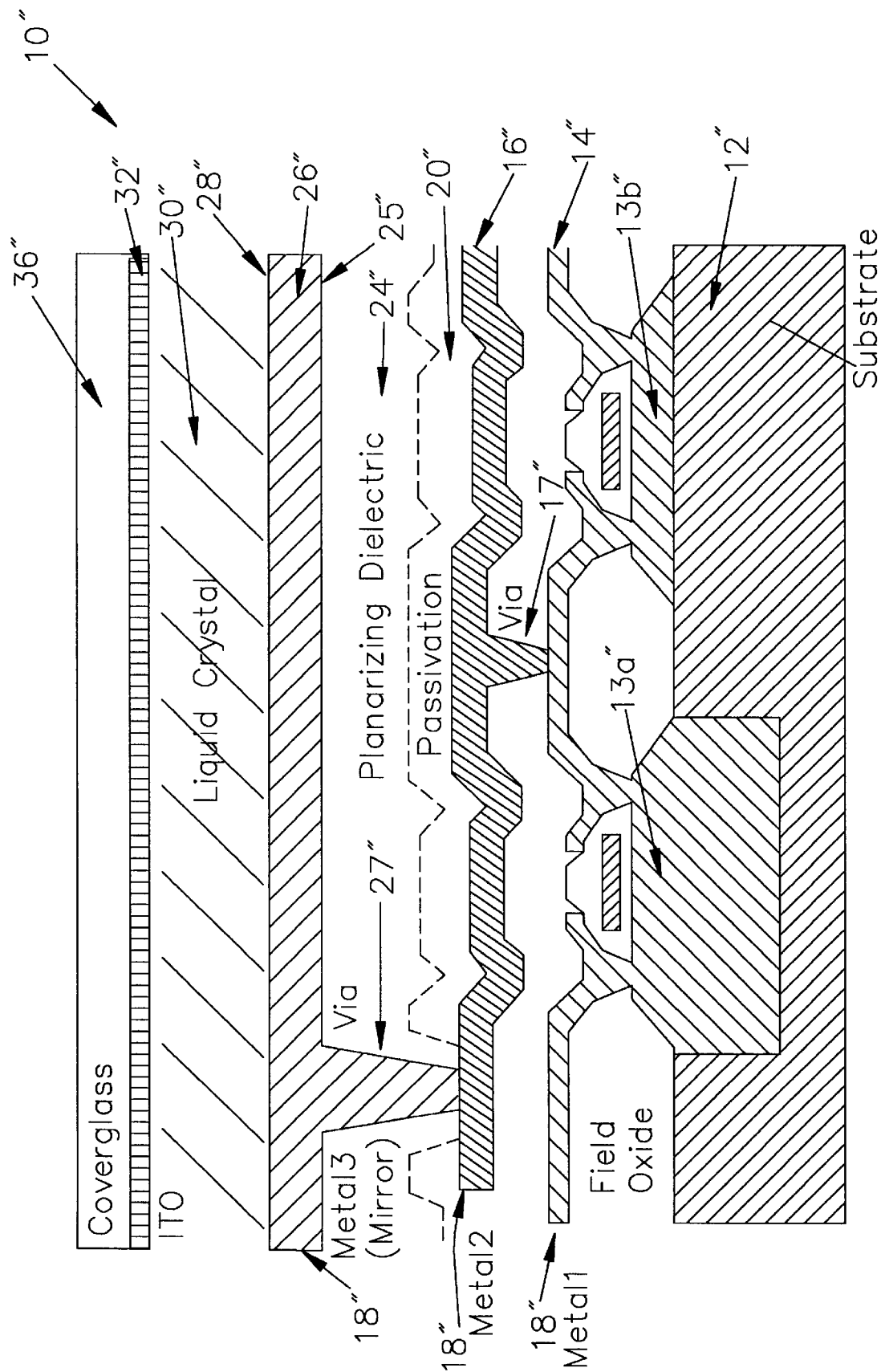
FIG. 5C is a cross-sectional view of an electro-optic device including a planarizing polymeric resin layer, according to another embodiment of the invention.

FIG. 5B shows a cross-sectional view of an electro-optic device 10', according to the invention, including a substrate 12', p-fet 13a', n-fet 13b', and an underlying metal layer 14'. A passivation layer 20' may optionally be disposed on underlying metal layer 14'. A planarizing layer 24' of polymeric resin is disposed on passivation layer 20', when the latter layer is present, or alternatively planarizing layer 24 of polymeric resin may be disposed on underlying metal layer 14'. Planarizing layer 24' is spin-cast and includes spin-cast flat surface 25'. Spin-cast flat surface 25' is sufficiently planar (DOP ca. 83%) such that chemical mechanical polishing thereof is unnecessary. Planarizing layer 24' of polymeric resin has one or more vias 27' etched therethrough (at least one via 27' per pixel). An overlying metal layer 26' is disposed on spin-cast flat surface 25'. Metal layer 26' makes electrical contact with underlying metal layer 14' through via 27'. Underlying metal layer 14' and overlying metal layer 26' together form lower, underlying, or lower electrode 18'. A layer of electro-optic material 30' is sandwiched between spin-cast flat surface 25' and a second electrode 32'. An optically transmissive layer 36' is disposed over second electrode 32'.

FIG. 5C shows a cross-sectional view of an electro-optic device 10", according to the invention, including a substrate 12", p-fet 13a", n-fet 13b", an underlying first metal layer 14", and an underlying second metal layer 16". Underlying second metal layer 16" makes electrical contact with underlying first metal layer 14" by via 17". A passivation layer 20" may optionally be disposed on underlying second metal layer 16". A planarizing layer 24" of polymeric resin is disposed on passivation layer 20", when the latter layer is present, or alternatively planarizing layer 24 of polymeric resin may be disposed on underlying second metal layer 16". Planarizing layer 24" is spin-cast and includes spin-cast flat surface 25". Spin-cast flat surface 25" is sufficiently planar (DOP ca. 83%) such that chemical mechanical polishing thereof is unnecessary. Planarizing layer 24" of polymeric resin has one or more vias 27" etched therethrough (at least one via 27" per pixel). An overlying metal layer 26" is disposed on spin-cast flat surface 25". Metal layer 26" makes electrical contact with underlying first metal layer 14" through via 27". Underlying first metal layer 14", underlying second metal layer 16", and overlying metal layer 26" together form lower, underlying, or lower electrode 18". A layer of electro-optic material 30" is sandwiched between spin-cast flat surface 25" and a second electrode 32". An optically transmissive layer 36" is disposed over second electrode 32".

According to one embodiment of the invention substrate 12, 12', 12" may include a silicon substrate or silicon wafer. A preferred planarizing polymeric resin layer 24, 24, 24" includes spin cast polymeric BCB. Preferably spin-cast flat surface 25, 25', 25" provides a planar surface of BCB which does not require buffing or polishing (e.g. by CMP) and which has a DOP of at least 80%. A preferred overlying metal layer 28', 28" includes a layer of Al. More preferably, overlying metal layer 28', 28" consists of pure Al having a purity of at least 99% Al by weight, and has a thickness of about 5,000 Å. A preferred electro-optic material 30, 30', 30" includes a liquid crystal material. Second electrode 32, 32', 32" preferably includes indium tin oxide. Preferably optically transmissive layer 36, 36', 36" includes a coverglass or similar material.

Figure 6B:
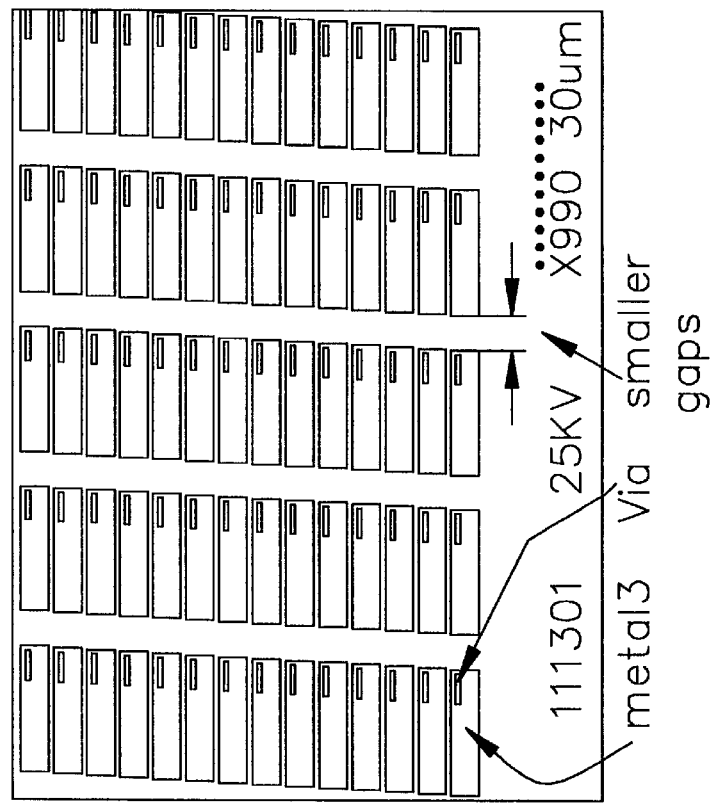
FIGS. 6A and 6B are scanning electron micrographs of a 640 by 512 pixel LCOS backplane, before planarization (6A) and after planarization (6B), according to one embodiment of the invention (magnification =990×).
Figure 6A:
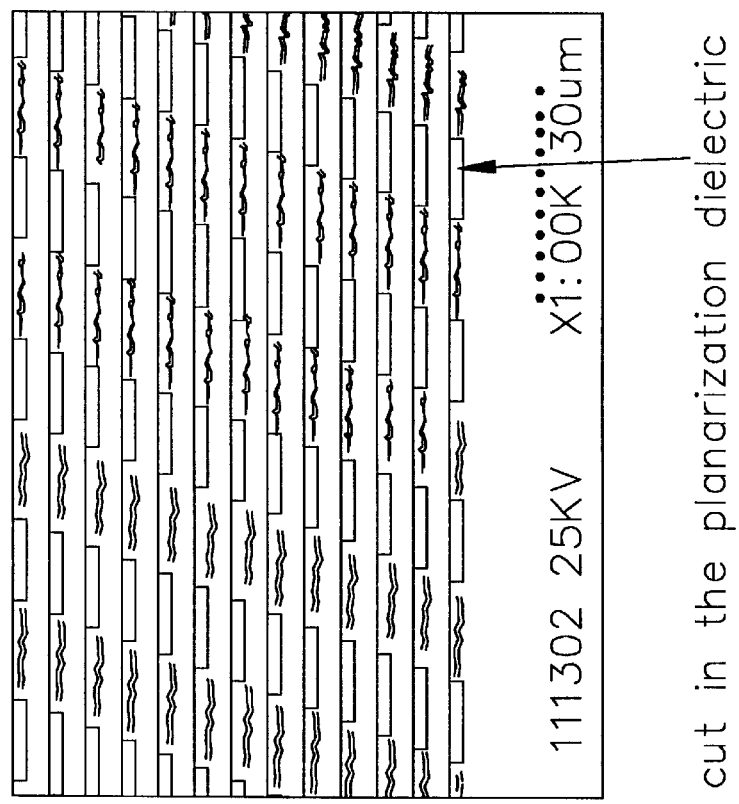

FIGS. 6A and 6B are scanning electron micrographs of a 640 by 512 pixel LCOS backplane, before and after planarization, respectively, according to one embodiment of the invention. The magnification is 990×. FIG. 6A shows an unplanarized LCOS backplane which lacks both a spin-cast layer of polymeric resin and an overlying metal layer and which has a relatively uneven or bumpy surface. FIG. 6B shows a planarized LCOS backplane which includes a planarizing polymeric resin layer of BCB and an overlying metal layer (Al) on the planarizing polymeric resin layer. It can be seen from FIG. 6B that the surface is relatively even and planar (flat), that the gaps between the pixels are relatively small, and that the fill-factor is relatively high, as is described in more detail hereinbelow. Fill-factor provides a measure of the relative area of a mirror layer over a pixel as compared with the total area of a pixel.

Atomic force microscopy measurements of the planarized LCOS backplane pixel array (FIG. 6A) indicate a DOP of 83%, with the largest step height (1,500 Å) in the unetched spin-cast BCB planarizing layer occurring at the eventual via location. According to the invention, the mirror aperture ratio, including the via area, for dry etched mirrors is ca. 84%. Accounting for the via area, the pixel flat-fill factors were 82% and 81%, for the Ti hard mask and the soft mask (thin resist/etchback) methods, respectively.

According to the invention, electro-optic devices may include single pixel displays, multiple pixel displays, and retarder systems. Single pixel devices include color shutter devices such as three color—RGB, WRGB, KRGB, CMYK, CMYW, etc.; two color shutter devices such as—R/B, R/G, G/B, C/M, M/Y, C/Y, W/R, W/B, W/G, W/C, W/M, W/Y; achromatic shutters such as compound retarders, and rotators; optically addressed-applications to welding shields, such as PN diodes, and phototransistors.

Multiple pixel arrays (MPA's) may include optically addressed MPA's; retarders including patterned arrays such as stripes, triads, quads, etc., for use as color filter arrays for displays and imagers; and multiple pixel arrays which are electrically addressed wherein each pixel may have an independent voltage applied thereto, resulting in different optical states of the liquid crystals. Retarder systems may include two or more retarders for making, for example, Lyot, Solc, split element, and network synthesis approach to designing tunable optical filers.

An electro-optic material according to a device or method of the instant invention may include various liquid crystal materials which may in turn exhibit various electro-optic effects. Liquid crystal materials may include nematic liquid crystal and smectic liquid crystal types. Nematic liquid crystal materials may include twisted nematic, super twisted nematic, electrically controlled birefringence, and hybrid field effect materials, those materials used in zero-twist mode, hybrid mode effects, polymer dispersed liquid crystals, as well as surface mode devices including the pi-cell (e.g fluids such as ZLI 1565).

Smectic liquid crystal materials may include chiral smectics such as SmC* —surface stabilized, volume stabilized, binary, and analog; SmA* —electroclinic; distorted helix ferroelectric; anti-ferroelectric; flexoelectric; and hybrid subtractive (both field sequential and spatial).

Applications for devices and methods of the invention in flat-panel and cathode ray tube (CRT) displays and imaging systems include: projection systems (both front and rear projection); professional head-up displays (e.g. transportation—cars, trucks, airplanes); commercial applications, including conference room/boardroom projectors, desktop computing; consumer applications, including home theater, computer games, laptop displays, handheld pagers, etc.; instrumentation, including oscilloscopes, spectrum analyzers, etc.; web browsers, telecommunications, head-mounted displays for virtual reality augmented reality, portable wearable computers, and simulators.

?? Further including emissive displays, such as CRT's, electroluminescent displays, active matrix electroluminescent displays, field emission displays, and plasma displays. Still further including modulator displays such as active transmissive modulator displays (e.g. TFT-LCD (Seiko, Epson),and poly silicon LCD's (Sarif, Kopin)); active reflective modulator displays (e.g. crystalline silicon (Displaytech, Microdisplay Corp, BNS), digital mirror devices (Texas Instruments), Diffractive grating devices (Eschelle)); and passive displays—TN and STN.

The foregoing embodiments are merely exemplary and are not to be construed as limiting the present invention. The present methods can be readily applied to other types of apparatuses. The description of the present invention is intended to be illustrative, and not to limit the scope of the claims. Many alternatives, modifications, and variations will be apparent to those skilled in the art.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A method for forming a pixel for an electro-optic display, comprising the steps of:
   a) depositing an underlying metal layer on a silicon substrate;
   b) depositing a first photoresist layer on the underlying metal layer;
   c) patterning the first photoresist layer;
   d) developing the patterned first photoresist layer;
   e) wet or dry etching the underlying metal layer;
   f) removing the first photoresist layer;
   g) spin-casting a polymeric resin layer on the underlying metal layer resulting from said step e);
   h) curing the polymeric resin layer;
   i) depositing a hard mask on the cured polymeric resin layer;
   j) depositing a second photoresist layer on the hard mask;
   k) patterning the second photoresist layer;
   l) developing the second photoresist layer;
   m) wet or dry etching the hard mask;
   n) removing the second photoresist layer;
   o) dry etching the cured polymeric resin layer;
   p) removing the hard mask;
   q) depositing an overlying metal layer on the dry etched polymeric resin layer;
   r) depositing a third photoresist layer on the overlying metal layer;
   s) patterning the third photoresist layer;
   t) developing the third photoresist layer;
   u) etching the overlying metal layer; and
   v) removing the third photoresist layer.

2. A method for forming a pixel for an electro-optic display as claimed in claim 1, wherein said steps g) and h) provide a cured polymeric resin layer having a spin-cast flat surface.

3. A method for forming a pixel for an electro-optic display as claimed in claim 1, wherein said step g) comprises spin-casting a polymeric resin layer comprising an aromatic polymeric resin.

4. A method for forming a pixel for an electro-optic display as claimed in claim 1, wherein said step g) comprises spin-casting a polymeric resin layer comprising polymeric bisbenzocyclobutene.

5. In a method for making a via chain test device, the method comprising the steps of: a) depositing an underlying first metal layer on a silicon substrate; b) depositing a first photoresist layer on the underlying first metal layer; c) patterning the first photoresist layer; d) developing the patterned photoresist layer; e) wet or dry etching the underlying first metal layer; and f) removing the first photoresist layer; the improvement comprising the steps of:
   g) spin-casting a polymeric resin layer on the underlying first metal layer resulting from said step e);
   h) curing the polymeric resin layer to form a cured polymeric resin layer having a spin-cast flat surface;
   i) depositing a hard mask on the cured polymeric resin layer;
   j) depositing a second photoresist layer on the hard mask;
   k) patterning the second photoresist layer;
   l) developing the second photoresist layer;
   m) wet or dry etching the hard mask;
   n) removing the second photoresist layer;
   o) dry etching the cured polymeric resin layer;
   p) removing the hard mask;
   q) depositing an underlying second metal layer on the dry etched polymeric resin layer;
   r) depositing a third photoresist layer on the underlying second metal layer;
   s) patterning the third photoresist layer;
   t) developing the third photoresist layer;
   u) etching the underlying second metal layer; and
   v) removing the third photoresist layer.

6. A method for polymeric resin backplane planarization of a LCOS device, comprising the steps of:
   a) providing a substrate including an underlying metal layer;
   b) spin-casting a planarizing layer on the underlying metal layer;
   c) curing the planarizing layer to form a layer of cured polymeric resin having a spin-cast flat surface;
   d) depositing a hard mask on the cured polymeric resin layer;
   e) depositing a first photoresist layer on the hard mask;
   f) patterning the first photoresist layer;
   g) developing the first photoresist layer;
   h) wet or dry etching the hard mask;
   i) removing the first photoresist layer;

j) dry etching the cured polymeric resin layer;

k) removing the hard mask;

l) depositing an overlying metal layer;

m) depositing a second photoresist layer on the overlying metal layer;

n) patterning the second photoresist layer;

o) developing the second photoresist layer;

p) etching the overlying metal layer; and q) removing the second photoresist layer.

7. The method for polymeric resin backplane planarization of a LCOS device as claimed in claim 6, wherein said spin-cast planarizing layer of cured polymeric resin comprises an aromatic polymeric resin consisting entirely of carbon, hydrogen, and oxygen.

8. The method for polymeric resin backplane planarization of a LCOS device as claimed in claim 6, wherein said spin-cast planarizing layer of cured polymeric resin comprises polymeric bisbenzocyclobutene.

9. The method for polymeric resin backplane planarization of a LCOS device as claimed in claim 6, wherein said step c) comprises curing the planarizing layer to form a layer of cured polymeric resin having a spin-cast flat surface with a DOP value of at least 80%.

10. In an electro-optic device comprising a first electrode on a silicon substrate, the first electrode including underlying first and underlying second metal layers, the underlying first and underlying second metal layers electrically interconnected; a second electrode disposed on a light transmissive layer; and an electro-optic material disposed between the underlying second metal layer of the first electrode and the second electrode; the improvement comprising:

a spin-cast polymeric resin planarizing layer disposed on the underlying second metal layer, said.

11. In an electro-optic device as claimed in claim 10, the improvement further comprising an overlying metal layer disposed between said spin-cast polymeric resin planarizing layer and said electro-optic material, wherein said overlying metal layer is electrically interconnected with said underlying first and said underlying second metal layers.

12. In an electro-optic device as claimed in claim 10, the improvement further comprising a passivation layer disposed between the underlying second metal layer and the spin-cast polymeric resin planarizing layer.

13. An electro-optic device, comprising:

a substrate;

circuitry disposed on said substrate;

a first electrode disposed on said circuitry;

a spin-cast planarizing polymeric resin layer on said first electrode.

14. An electro-optic device, comprising:

a substrate;

circuitry disposed on said substrate;

a first electrode disposed on said circuitry;

a passivation layer disposed on said first electrode;

a spin-cast planarizing polymeric resin layer on said passivation layer.

15. An electro-optic device, comprising:

a substrate;

circuitry disposed on said substrate;

an underlying first metal layer disposed on said circuitry;

an underlying second metal layer disposed on said underlying first metal layer, wherein said underlying second metal layer is in electrical contact with said underlying first metal layer;

a spin-cast planarizing layer of polymeric resin disposed on said passivation layer;

an overlying metal layer disposed on said spin-cast planarizing layer of polymeric resin, wherein said overlying metal layer is in electrical contact with said underlying second metal layer, and wherein said underlying first metal layer, said underlying second metal layer, and said overlying metal layer comprise a first electrode of the electro-optic device.

16. The electro-optic device as claimed in claim 15, wherein said spin-cast planarizing layer of polymeric resin comprises an aromatic polymeric resin.

17. The electro-optic device as claimed in claim 15, wherein said spin-cast planarizing layer of polymeric resin comprises polymeric bisbenzocyclobutene.

18. The electro-optic device as claimed in claim 15, wherein said spin-cast planarizing layer of polymeric resin comprises a spin-cast layer of polymeric bisbenzocyclobutene having a thickness ranging from about 1–3 $\mu$m.

19. The electro-optic device as claimed in claim 15, wherein said spin-cast planarizing polymeric resin layer of polymeric resin comprises a spin-cast layer of poly (bisbenzocyclobutene) having a thickness of about 2 $\mu$m.

20. The electro-optic device as claimed in claim 15, wherein said overlying metal layer comprises aluminum.

21. The electro-optic device as claimed in claim 15, wherein said overlying metal layer has a thickness ranging from about 1,000–10,000 Å.

22. The electro-optic device as claimed in claim 15, wherein said overlying metal layer has a thickness ranging from about 2,000–8,000 Å and comprises aluminum having a purity in excess of 99% by weight.

23. The electro-optic device as claimed in claim 15, wherein said overlying metal layer has a thickness of about 5,000 Å and comprises aluminum having a purity in excess of 99% by weight.

24. A method for making an electro-optic device including at least one pixel, comprising the steps of:

a) providing a substrate having pixel circuitry disposed thereon;

b) providing an underlying first metal layer on the pixel circuitry;

c) providing an underlying second metal layer disposed on the underlying first metal layer, wherein the underlying second metal layer is in electrical contact with the underlying first metal layer;

d) optionally, providing a passivation layer on the underlying second metal layer;

e) spin-casting a planarizing polymeric resin layer on the passivation layer;

f) curing the planarizing polymeric resin layer at an elevated temperature;

g) dry etching the planarizing polymeric resin layer;

h) depositing an overlying metal layer on the dry etched spin-cast planarizing polymeric resin layer, wherein the overlying metal layer is in electrical contact with the underlying second metal layer, and wherein the underlying first metal layer, the underlying second metal layer, and the overlying metal layer comprise a first electrode of the electro-optic device; and i) etching the overlying metal layer.

25. The method of claim 24, further comprising the steps of:

j) after said step f), depositing a hard mask on the planarizing polymeric resin layer;

k) coating a photoresist on the hard mask;

l) patterning the photoresist;

m) developing the photoresist;

n) wet etching the hard mask;

o) removing the photoresist; and p) after said step g) removing the hard mask of said step j).

26. A method for making an electro-optic device including at least one pixel, comprising the steps of:

providing a substrate having pixel circuitry disposed thereon;

providing an underlying metal layer on the pixel circuitry;

spin-casting a planarizing polymeric resin layer on the passivation layer;

curing the planarizing polymeric resin layer dry etching the planarizing polymeric resin layer;

depositing an overlying metal layer on the dry etched spin-cast planarizing polymeric resin layer, wherein the overlying metal layer is in electrical contact with the underlying metal layer, and wherein the underlying metal layer and the overlying second metal layer comprise a first electrode of the electro-optic device; and etching the overlying metal layer.

27. A method for making an electro-optic device including at least one pixel, comprising the steps of:

providing a substrate having pixel circuitry disposed thereon;

providing an underlying first metal layer on the pixel circuitry;

providing an underlying second metal layer disposed on the underlying first metal layer, wherein the underlying second metal layer is in electrical contact with the underlying first metal layer and the underlying first metal layer and the underlying second metal layer comprise a first electrode of the electro-optic device;

spin-casting a planarizing polymeric resin layer on the passivation layer; and curing the planarizing polymeric resin layer.

28. The method for making an electro-optic device including at least one pixel as claimed in claim 27, wherein said spin-casting step comprises spin-casting a layer of polymeric BCB.

29. The method for making an electro-optic device including at least one pixel as claimed in claim 27, wherein said planarizing polymeric resin layer includes a spin-cast flat surface.

30. An LCOS device having polymeric resin backplane planarization according to claim 6.

31. An electro-optic device made according to the method of claim 24.

* * * * *